US008825856B1

(12) United States Patent
Breau et al.

(10) Patent No.: US 8,825,856 B1
(45) Date of Patent: Sep. 2, 2014

(54) USAGE-BASED CONTENT FILTERING FOR BANDWIDTH OPTIMIZATION

(75) Inventors: Jeremy R. Breau, Kansas City, MO (US); Bob Pippert, Lenexa, KS (US); Douglas R. Green, Lenexa, KS (US); Lyle W. Paczkowski, Mission Hills, KS (US); Samuel M. Woleben, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 12/168,854

(22) Filed: Jul. 7, 2008

(51) Int. Cl.
*G06F 15/173* (2006.01)

(52) U.S. Cl.
USPC ......................................................... 709/226

(58) Field of Classification Search
CPC ..................... H04L 67/2823; H04L 67/2828
USPC ......... 709/200, 217, 218, 219, 223, 226, 227, 709/250; 707/3, 10; 370/401, 351, 352; 715/738, 513, 769
See application file for complete search history.

(56) References Cited

U.S. PATENT DOCUMENTS

| | | | | | |
|---|---|---|---|---|---|
| 6,167,441 | A | * | 12/2000 | Himmel | 709/217 |
| 6,775,291 | B1 | * | 8/2004 | Ryu et al. | 370/401 |
| 6,959,319 | B1 | | 10/2005 | Huang et al. | |
| 7,548,612 | B2 | * | 6/2009 | Weissman et al. | 379/88.17 |
| 8,321,359 | B2 | * | 11/2012 | Buchs et al. | 706/19 |
| 2001/0047404 | A1 | * | 11/2001 | Suda | 709/223 |
| 2002/0091738 | A1 | * | 7/2002 | Rohrabaugh et al. | 707/517 |
| 2002/0099829 | A1 | * | 7/2002 | Richards et al. | 709/227 |
| 2003/0004984 | A1 | * | 1/2003 | Chou | 707/500 |
| 2003/0028647 | A1 | * | 2/2003 | Grosu | 709/227 |
| 2003/0063129 | A1 | * | 4/2003 | Smyth et al. | 345/810 |
| 2003/0065706 | A1 | * | 4/2003 | Smyth et al. | 709/200 |
| 2003/0079041 | A1 | * | 4/2003 | Parrella et al. | 709/247 |
| 2003/0105682 | A1 | | 6/2003 | Dicker et al. | |
| 2003/0110161 | A1 | * | 6/2003 | Schneider | 707/3 |
| 2003/0185197 | A1 | * | 10/2003 | Banerjee et al. | 370/351 |
| 2003/0225885 | A1 | * | 12/2003 | Rochberger et al. | 709/226 |

(Continued)

FOREIGN PATENT DOCUMENTS

EP           1061458 A2 * 12/2000    ............. G06F 17/30
WO    02/091154 A2    11/2002

(Continued)

OTHER PUBLICATIONS

"Content Transformation Guidelines 1.0." W3C Working Draft Apr. 14, 2008.*

(Continued)

*Primary Examiner* — Imad Hussain

(57) ABSTRACT

Media and systems are provided for limiting bandwidth consumption in a network environment by presenting customized browser-presentable resources. A request for a base universal resource locator (URL), followed by a request for a specific resource, is received. An optimized URL for the request is generated. When a predetermined number of requests for the specific component resource are received during the course of accessing the base URL, subsequent user requests for the base URL are redirected to the optimized URL. Thus, only the specific resources are presented for display. Requests to return to the base URL can result in discontinuing redirection. Returning to the base URL and accessing additional resources can modify the enhanced URL or redirect requests for the base URL to a difference component resource. Network bandwidth usage is enhanced by recognizing repetitive user requests.

19 Claims, 11 Drawing Sheets

(56) References Cited

U.S. PATENT DOCUMENTS

| | | | |
|---|---|---|---|
| 2004/0049598 A1* | 3/2004 | Tucker et al. | 709/246 |
| 2004/0054923 A1 | 3/2004 | Seago et al. | |
| 2004/0064588 A1* | 4/2004 | Jungck | 709/247 |
| 2004/0139170 A1* | 7/2004 | Shen et al. | 709/218 |
| 2004/0148565 A1* | 7/2004 | Davis et al. | 715/501.1 |
| 2004/0177015 A1* | 9/2004 | Galai et al. | 705/35 |
| 2004/0233898 A1* | 11/2004 | Otsuka et al. | 370/352 |
| 2005/0108406 A1 | 5/2005 | Lee | |
| 2005/0198395 A1* | 9/2005 | Verma et al. | 709/247 |
| 2006/0053090 A1* | 3/2006 | Cotter et al. | 707/3 |
| 2006/0075072 A1* | 4/2006 | Sinclair et al. | 709/219 |
| 2006/0248452 A1* | 11/2006 | Lambert et al. | 715/513 |
| 2007/0283036 A1* | 12/2007 | Dey et al. | 709/233 |
| 2008/0052639 A1 | 2/2008 | Chun et al. | |
| 2008/0195761 A1* | 8/2008 | Jabri et al. | 709/250 |
| 2008/0222273 A1* | 9/2008 | Lakshmanan et al. | 709/219 |
| 2009/0070413 A1* | 3/2009 | Priyadarshan et al. | 709/203 |
| 2009/0083646 A1* | 3/2009 | Lin et al. | 715/769 |
| 2009/0222454 A1* | 9/2009 | Liesche et al. | 707/10 |
| 2009/0222737 A1* | 9/2009 | Liesche et al. | 715/738 |

FOREIGN PATENT DOCUMENTS

| | | | |
|---|---|---|---|
| WO | 02/091154 A3 | 11/2002 | |
| WO | 2007/071529 A1 | 6/2007 | |
| WO | 2010/017434 A1 | 2/2010 | |

OTHER PUBLICATIONS

Final Office Action in U.S. Appl. 12/188,659 mailed Mar. 9, 2012.

PCT International Searching Authority Notification of Transmittal Of The International Search Report And The Written Opinion Of The International Searching Authority, Or The Declaration, Date of mailing: Mar. 11, 2009; International fiing date: Jul. 8, 2009; Applicant: Sprint Communications Company L.P., Applicant's or Agent's file reference: SPRI140558/5, International application No. PCT/US2009/053078, 14 pages.

Non-Final Office Action Responsive to Communication Filed on Aug. 8, 2008, U.S. Appl. No. 12/188,659, filed Aug. 8, 2008, First Named Inventor: Jeremy R. Breau, Mail Date: May 19, 2010, 12 pages.

Final Office Action, Mail Date: Oct. 28, 2010, U.S. Appl. No. 12/188,659, filed Aug. 8, 2012, 12 pages.

Non_Final Office Action mailed Oct. 11, 2011 U.S. Appl. 12/188,659, 9 pages.

Final Office Action mailed Oct. 28, 2010.

Notice of Allowance and Fee(s) Due mailed Feb. 11, 2013 in U.S. Appl. No. 12/188,659; 20 pages.

\* cited by examiner

USAGE-BASED CONTENT FILTERING FOR BANDWIDTH OPTIMIZATION

SUMMARY

The present invention is defined by the claims below. A high-level overview of embodiments of the invention are provided here for that reason, to provide an overview of the disclosure.

In a first aspect, computer-readable media include instructions for limiting bandwidth consumption in a network environment through customized presentation of browser-presentable resources. A request for a file at a base universal resource locator (URL) is received, followed by a request for a specific component resource that is accessible from the file at the base URL. An optimized URL is generated. The optimized URL, which can be stored, presents only the specific URL resource to the user. When a predetermined number of requests for the specific URL resource are received, subsequent requests for the base URL are redirected to the optimized URL.

In a second aspect, a system for presenting web pages is provided that enhances network bandwidth usage through recognition of repetitive user requests. The system includes network components configured to monitor user requests for URLs. A data structure storing one or more enhanced URLs is also included in the system. The data structure associates the base URL with the specific resources at the base URL. The system then redirects subsequent requests for the file at the base URL to the file that includes the enhanced URL.

In a third aspect, computer-readable media for optimizing bandwidth usage through the delivery of customized presentations of frequently accessed URL resources. A first request is received for the file at a base URL. A request is received for a first component resource that can be accessed from a link located in a file at the base URL. The URL of the first component resource is stored as a first optimized URL. After storing the first optimized URL, a predetermined number of additional requests for the first component resource by way of the base URL are received. Without user intervention, subsequent requests for the base URL are redirected to the first optimized URL. Requests to return to the base URL can result in discontinuing redirection. Returning to the base URL and accessing additional resources can change the enhanced URL or redirect requests for the base URL to a different component resource altogether.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
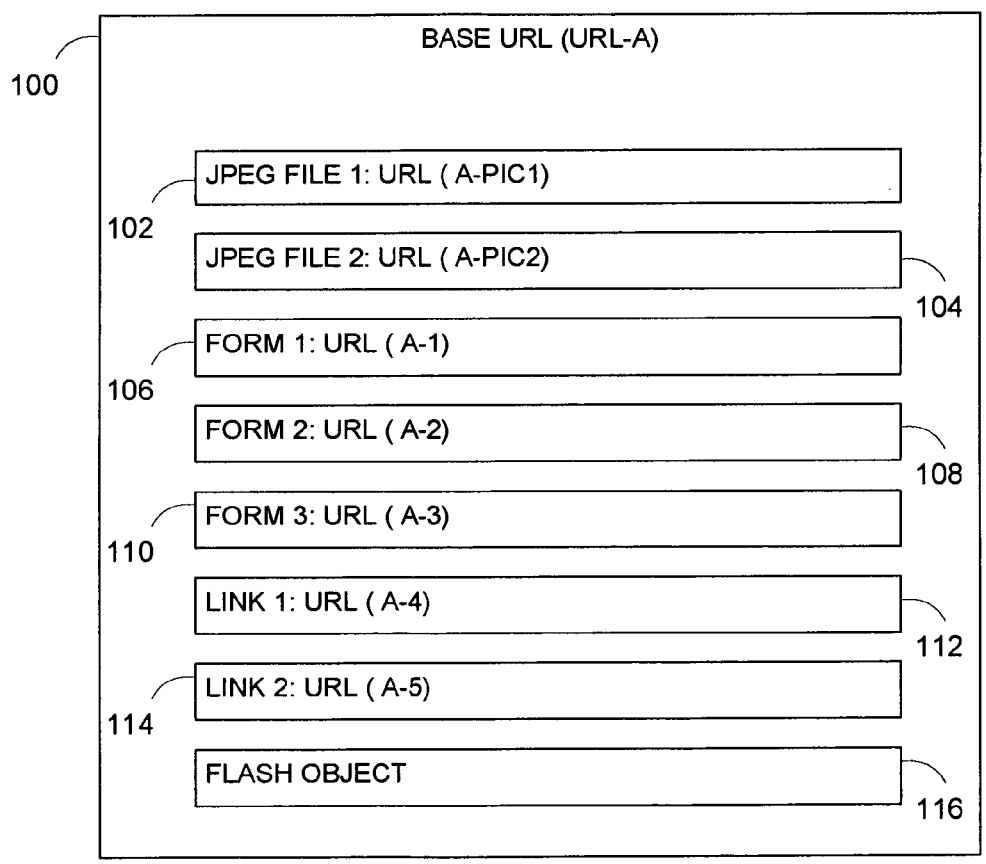
FIGS. 1-2 depict simplified diagrams of files contained at base and optimized URLs, respectively.

Embodiments of the present invention provide systems and computer-readable media optimizing bandwidth usage in a telecommunications network. When requests are made to access the same content repeatedly, without accessing other content available at a particular URL, the presentation of the unused content might be considered wasteful. Network resources are expended for the communication of pictures, flash objects, and links that the requester may have little to no interest in accessing. Additionally, users may be forced to wait as the particular resource they wish to access is loaded after unwanted content has already been received. Thus, in addition to benefits enjoyed by the network provider, the user experience would be enhanced in some situations if only the resources the user wished to access were presented.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| EV-DO | Evolution-Data Optimized |
| GPRS | Global Packet Radio Service |
| GSM | Global System for Mobile (communication) |
| HTML | Hypertext Markup Language |
| IP | Internet Protocol |
| PDA | Personal Data Assistant |
| URL | Universal Resource Locator |
| XHTML | Extensible Hypertext Markup Language |
| XML | Extensible Markup Language |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media, which is non-transitory in nature, include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are used for limiting the bandwidth consumed on a wireless network by altering what is presented in response to a request for a URL. In general, a URL directs a request to a file stored on a web server. That file may contain text, which is usually part of the file, as well pictures, animation, audio, video or other items. The additional items that are not text-oriented are usually data-intensive, depending on the type and size of the resource. While these resources may be included as part of the file at the specified URL, they are more likely to be hyperlinks, or references, to files at other locations. Thus, the file at the original URL can have a handful or hundreds of component resources that are URLs in their own right.

The files associated with the component-resource URLs may be located on the same server as the file that is serving as the "base" URL, or may be stored elsewhere. As an example, a news-oriented web site may have pictures displayed along with a news story. The base URL for this news story may direct the user to a file containing text and additional URLs for the pictures shown along side. In this example, the URLs for the pictures are the component resources for the base URL utilized for accessing the story. Another example of a component resource may be found within a file for a site providing general portal services. A search bar, which is a form field, may be one of the component resources of this portal. The general portal may also provide an electronic mailbox for receiving e-mail. The file to which the base URL directs a request may have a picture and hyperlink for the mailbox function, as well as a picture and form action for the search bar. The general portal may have links for resources that are not on the same server, such as a link to the homepage of an advertiser, which is associated with a picture also stored on a different server. Component resources that are available from files at base URLs are enormously varied, but for the sake of clarity a typical base file may contain resources such as pictures, forms, additional hyperlinks, flash animation, as well as other forms of media and types of information.

Visitors to web sites access many different resources within the site on a regular basis, such as the reader of an on-line newspaper. While always accessing the primary site of the online newspaper, accessing different stories with every request may make the requests at this site less repetitive than other potential user requests. On the other hand, if visits to a general portal web site only result in requests to access an electronic mailbox, then the requests become extremely repetitive. By leveraging this repetition as described below, a network provider can reduce the overall traffic on its network. One manner for leveraging the repetitive requests is by presenting only the component resources in an optimized or enhanced URL to be described in further detail below.

Figure 2:
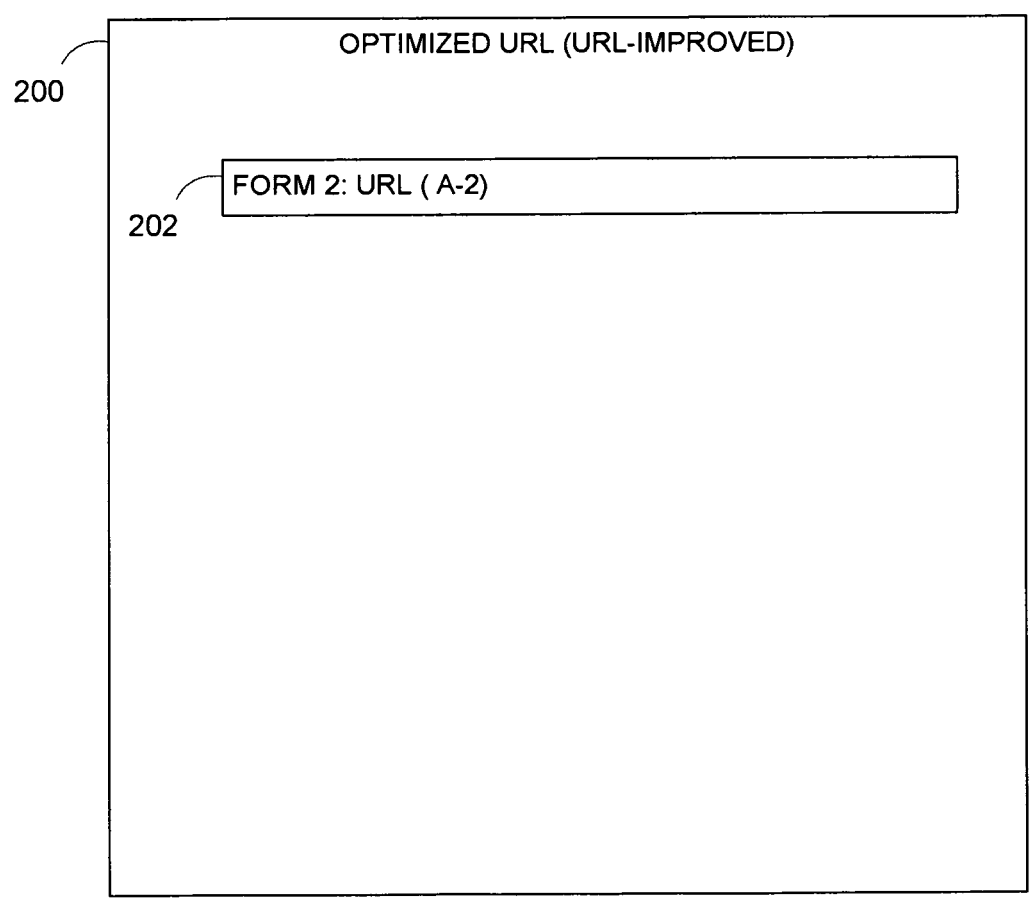

Turning now to FIGS. 1 and 2, simplified diagrams of exemplary files that can be accessed by requests for base and optimized URLs, respectively, are shown. Throughout this disclosure, like numbers will be used to denote similar features where possible. FIG. 1 depicts a simplified file 100 which can be accessed at a base URL. This is also denoted at the top of file 100 as URL-a. This could be any web page using a programming markup language, such as hypertext markup language (HTML), extensible markup language (XML), or extensible hypertext markup language (XHTML). This list of languages is not meant to be exhaustive, but rather indicative that any typical browser-usable language is acceptable. Not shown in file 100 could be scripts, coding for additional text, or other conventional web components that are likely to be present. File 100 includes: links 102 and 104 to jpeg pictures; links 106, 108, and 110 to forms; links 112 and 114 to other web pages; and a flash object 116. This is not meant to constrain the present invention to specific web sites including specific proportions of component resources. Any combination of component resources could be utilized and fall within the scope of the present invention. A simplified form of a file 200 for an optimized URL is given in FIG. 2. This is denoted as URL-improved at the top of the simplified file diagram. In contrast to file 100 of the base URL, file 200 of the optimized URL has just a single component resource. For the sake of this example, a link to a web form 202 has been selected as a repetitively accessed resource.

An example in accordance with file 100 might be the web page at a general services portal as described above. There may be standard graphics, links, and advertising. This page can also include a search form, which would be coded as a form taking the user to search results. If the user only goes to the portal web site to access its search feature, which is this form, then file 200 would replace the entirety of file 100 with the reduced content of link 202. While the hypertext links or embedded jpeg files, links, forms, and flash objects may require hundreds of kilobytes more memory allocation, the streamlined presentation of URL-improved may necessitate only a few kilobytes of processing and network resources. Thus, by presenting only what the user repetitively accesses, and doing so for a great number of requests, network traffic for certain requests can be reduced by orders of magnitude.

Figure 3:
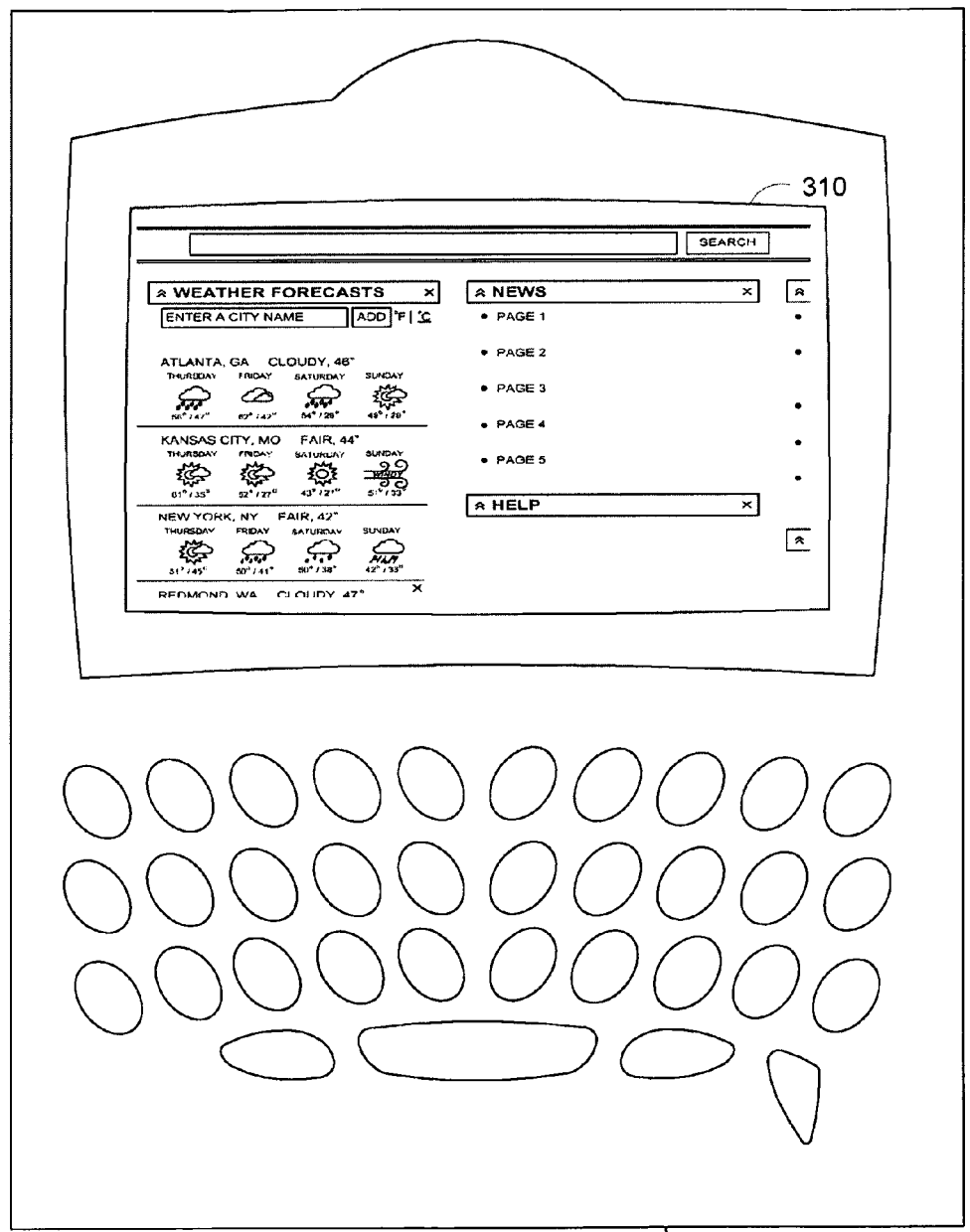
FIGS. 3-5 are exemplary simulated browser presentations on a web-enabled mobile device.
Figure 4:
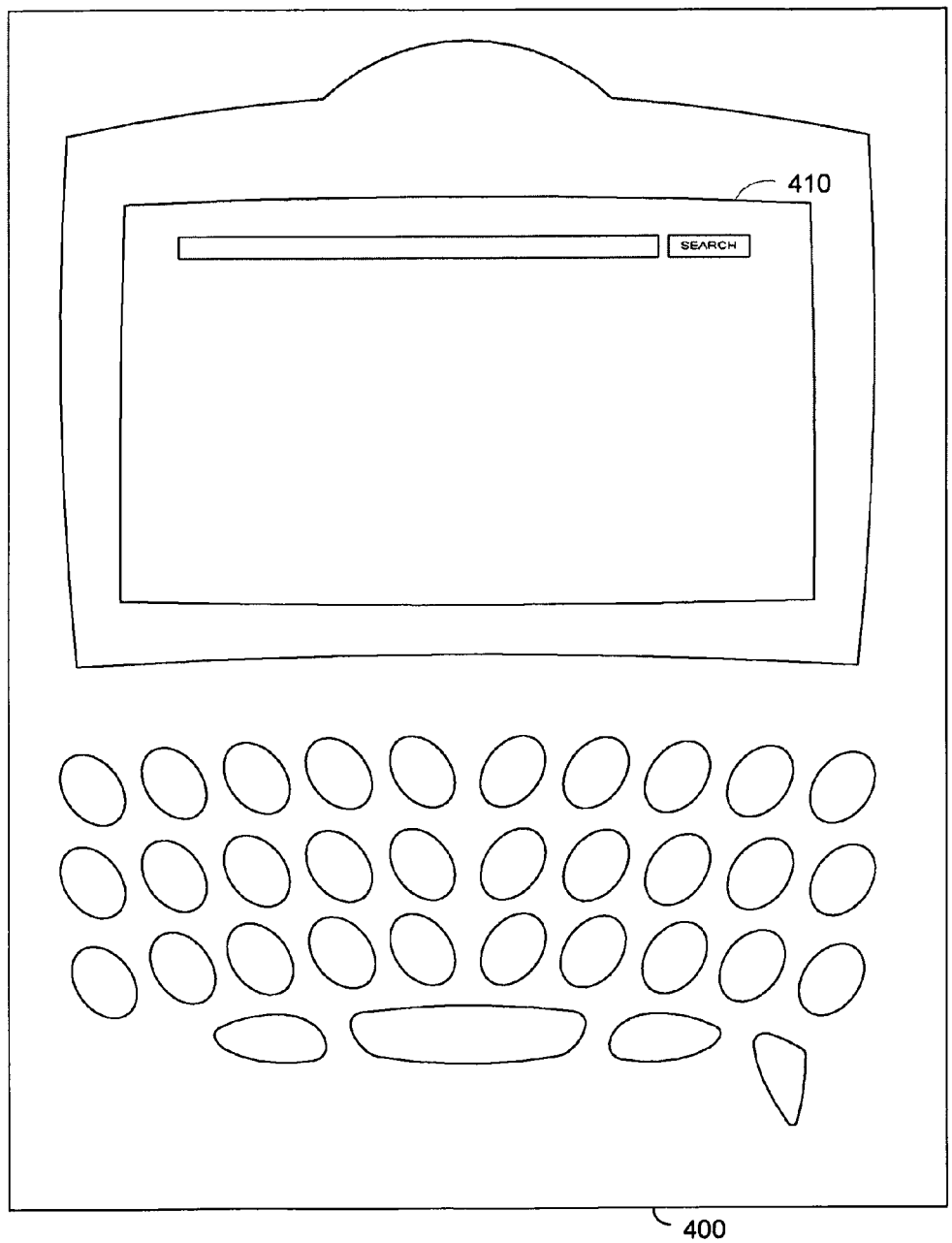
Figure 5:
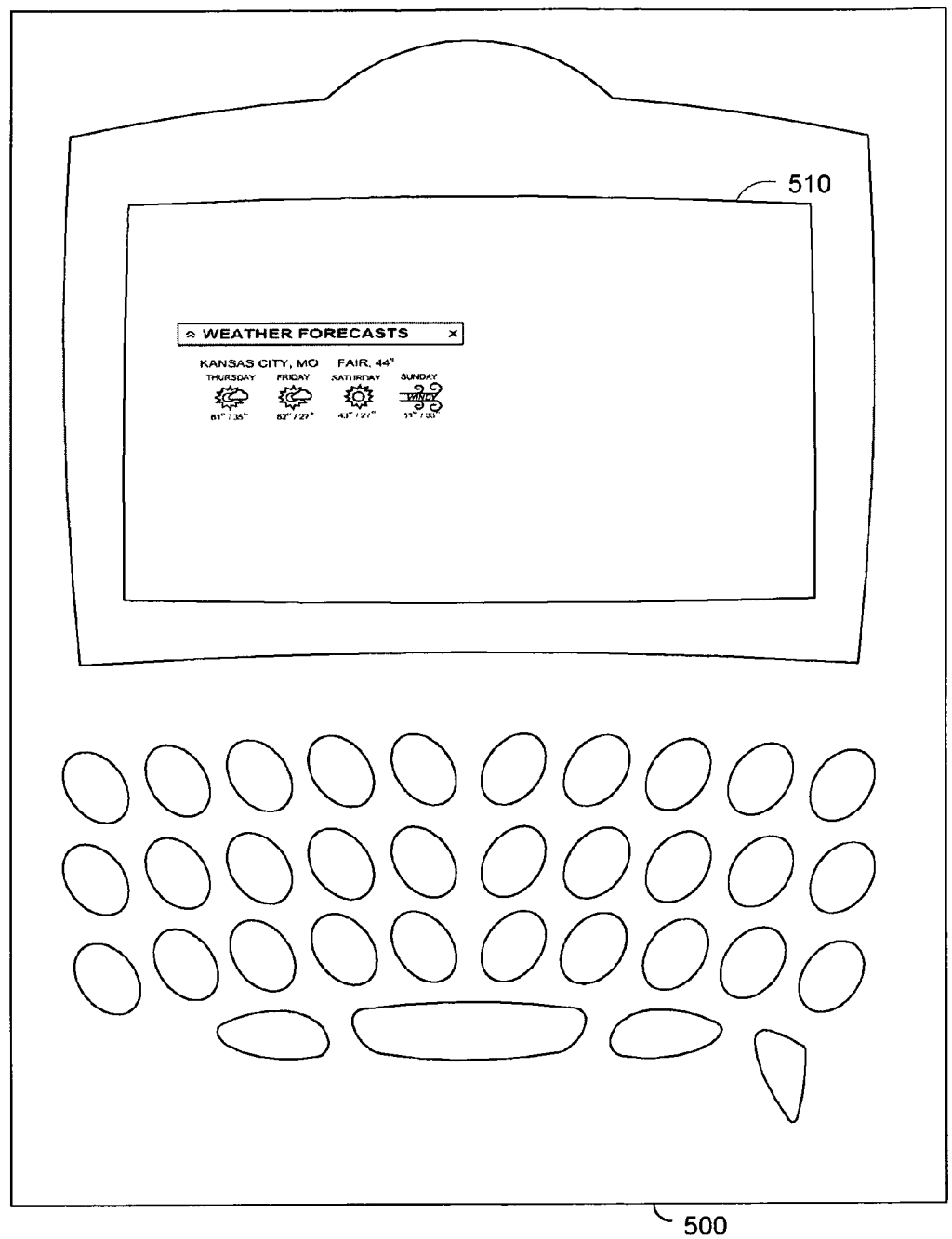

Moving to FIGS. 3-5, exemplary simulated browser presentations on a web-enabled mobile device are depicted. FIG. 3 shows a screen presentation 310 with an illustrative web site. The site includes a search bar at the top, along with graphics for weather forecasts, links to news stories, and a link to a help feature. Other features of the exemplary page are only partially visible, but are part of the accessed URL as well. When reviewing the simplified file 100 of FIG. 1, one can associate the pictures, links and components with similar features on the mobile device display. Looking at a second exemplary screen presentation shown in FIG. 4, a screen presentation 410 displays a very different look. Only the search bar of the previous web site is presented to the user. This depiction would closely parallel the example from FIGS. 1 and 2. By providing only the one form typically requested, seen here as the search bar form, the amount of data that must be transferred is greatly reduced. Likewise, the user is presented with exactly the component resources he or she prefers to access, rather than the whole of screen presentation 310. As seen in FIG. 5, a third screen presentation 510 includes a local weather forecast only. This may be a single jpeg picture, so that replacing link 202 from FIG. 2 will result in link 202 directing requests to a picture or location, rather than a form.

Figure 6:
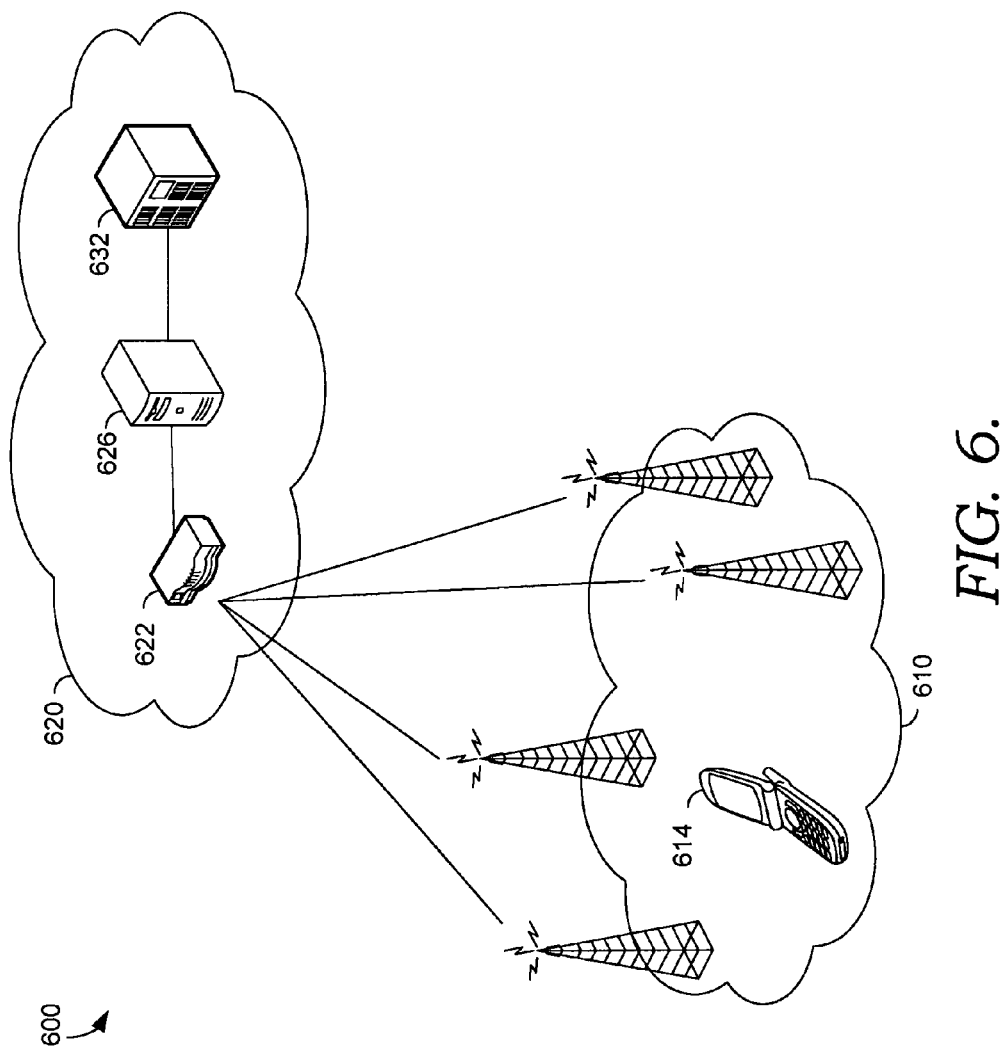
FIGS. 6-7 depict exemplary systems with which embodiments of the present invention may be practiced.
Figure 7:
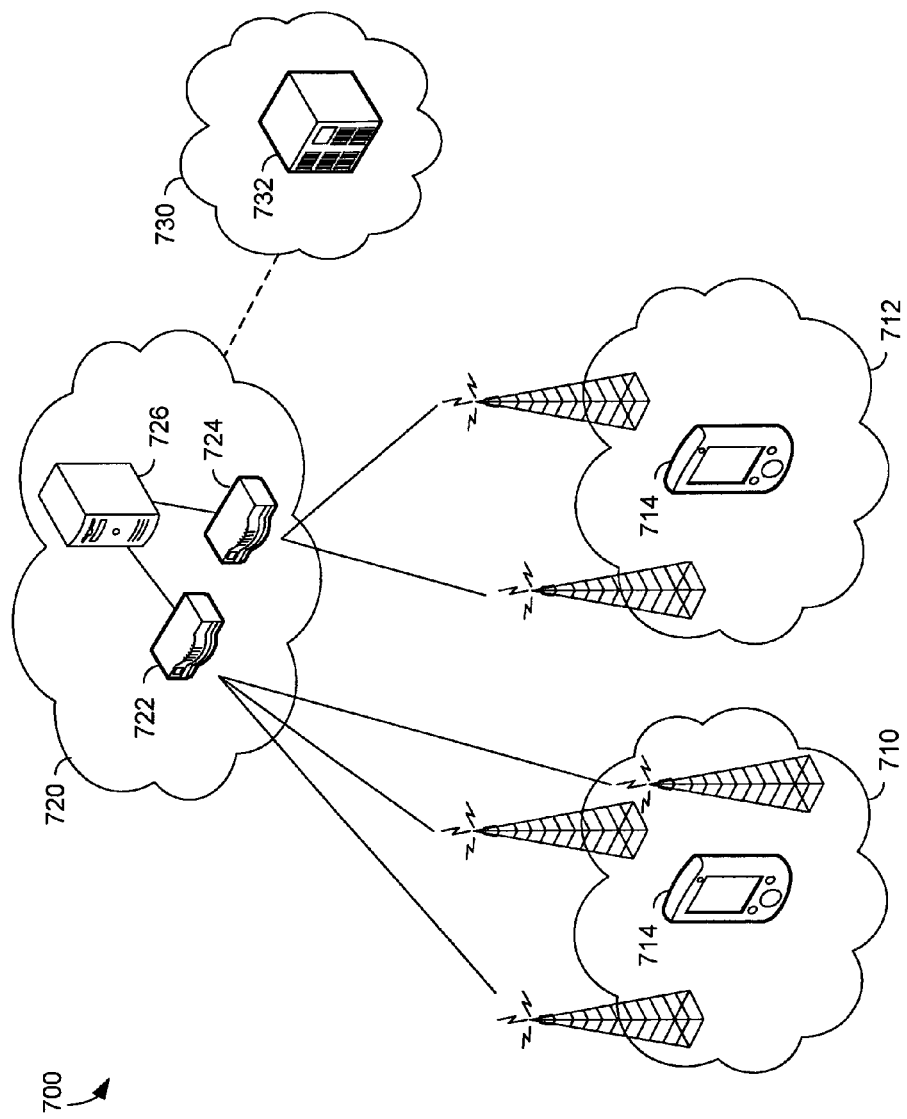

Turning now to FIGS. 6 and 7, exemplary systems for carrying out embodiments of the present invention are depicted. The systems shown are greatly simplified and will be described only to the extent necessary for understanding particular embodiments of the present invention. Thus, the systems shown are not intended to exclude devices not shown as part of the illustrative telecommunications network.

System 600 shows a mobile device 614 that can be used on a network 610 to browse internet web sites. Mobile device 614 can be a web-enabled cellular phone. Any web-enabled device could also employ embodiments of the present invention, such as laptop computers, desktop computers, personal data assistants, and the like. Network 610 also includes cellular towers used in conjunction with base transceiver stations (BTSs), however the use of a cellular tower is not necessary either. For instance, a system using a "picocell" or "femtocell" unit for indoor reception—themselves reduced-scale towers and base transceiver stations—would be of equally beneficial use. A network using any one of a variety of access methods could be used. A conventional code division multiple access (CDMA) protocol or global system for mobile (GSM) communications protocol can be used. Likewise, a network using a data-only protocol, such as one compliant with the Evolution-Data Optimized standard (EV-DO) or global packet radio service (GPRS) could be used. Other data-only access technologies include wireless microwave access technologies, such as those following the Worldwide Interoperability for Microwave Access (WiMAX) protocol promulgated by the WiMAX Forum® and administered at Beaverton, Oreg. The protocol used to provide access does not limit the embodiments of the present invention as any network sending and receiving information can be enhanced through use of this optimization.

Continuing with FIG. 6, a system of two devices along with a server are shown within a network that provides connectivity services, denoted as network 620. Included as part of network 620 are a gateway 622, a data store 626, and a web server 632. Network 620, when implemented, will likely include hundreds or thousands of components. The number, configuration, and complexity of devices will be determined by the size of the provider network. However, for the sake of clarity, selected devices are depicted in the figures so as not to obscure certain aspects of embodiments of the present invention. Server 632, which is configured to provide web serving functions, need not be located on network 620. Rather the connection drawn between gateway 622 and server 632 could easily cross two separate networks. The connection could traverse many different networks between gateway 622 and server 632 in order to provide web site files via the internet. Server 632 will be capable of delivering information in a protocol such as Internet Protocol (IP).

One feature of the embodiments of the present invention is a connection between gateway 622 and data store 626, and a connection between gateway 622 and mobile device 614 via network 610. When mobile device 614 makes a request to gateway 622 for specific resources on a web site, gateway 622 receives the specific request. Because of this communication, data store 626 can store such information as an optimized URL, e.g. file 200 seen in FIG. 2. This information will alternatively be referred to as an enhanced URL, although both terms are used to denote the same concept. Because future requests from mobile device 614 to web server 632 are processed through gateway 622, it can access data store 626 to determine if an optimized URL should be requested. Communications with web server 632 can be expedited by requesting only the resources needed in the specific request. While shown as two separate devices, gateway 622 and data store 626 can be implemented together. Thus, any gateway on network 620 would have its own data store of optimized URLs. The optimized URL can be used as a redirection tool by gateway 622 after a certain number of requests for the specific resource have been received. This process will be described in further detail below. Gateway 622 and data store 626 could store based the enhanced URLs based on a number of schemes. One example is through the use of a user profile, accessible upon authentication to the network. This also could be implemented based on the requester phone number, within a cellular phone context. The specific scheme is not limiting and any method of tracking requests would fall within the scope of the present invention.

The devices shown in system 700 are similar to those in system 600, but are configured in a slightly different manner. Also included in system 700 is a network 710 for access and a mobile device 714, in this figure represented by a more sophisticated mobile device with greater data capabilities. However, server 732 is now shown as located on a network accessible via the internet, numbered as network 730. The coupling of network 720 and network 730 is shown with a dashed line to indicate that the specific route of this communication flow may vary. Also depicted differently is the gateway-data store configuration. Gateway 722 is now in communication with data store 726, but separately from its communication with server 732. This is to indicate a central data store on the network that may be accessed from any device completing such requests. To reinforce the idea of centralized accessibility, a second gateway 724 is shown that is connected to its own access network, a network 712. By providing data store 726 as a central repository of optimized URLs, then any request on the network may be examined to make sure that an optimized URL does not exist. Therefore, when device 714 moves to a different access point, for example on network 712, then the data store can be referenced just as it would if device 714 sent any subsequent requests from network 710. While adding an additional request on network 720, this additional request may be of considerable overall savings to the network when compared to completing each request to data-intensive web pages without the use of an optimized URL.

Figure 8:
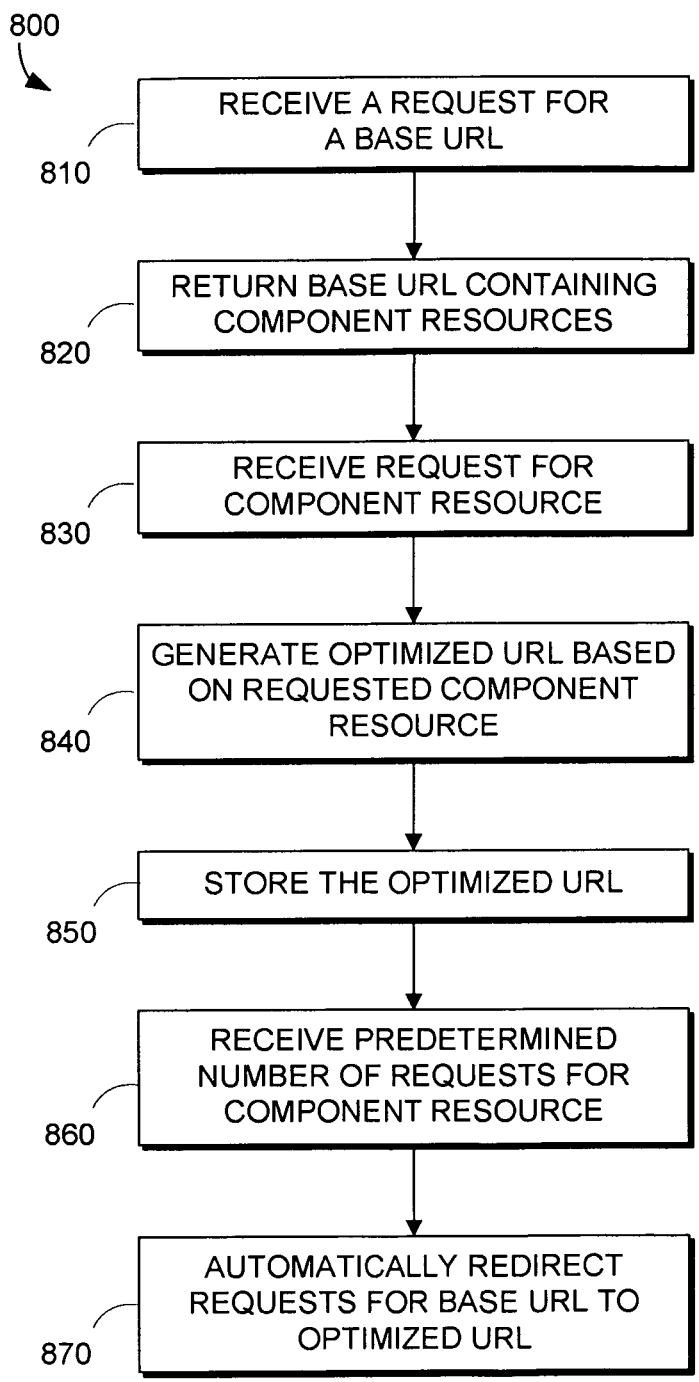
FIG. 8 is a flow diagram of a method for generating optimized URLs.

A flow diagram for a method for generating optimized URLs 800 is shown in FIG. 8. When applicable, devices and components from FIGS. 1-7 will be used to further illustrate this method. Method 800 begins with receiving a request for the file located at a base URL as shown at a step 810. For example, this could be a request by mobile device 714 to view the contents of any web page. At a step 820, the file located at the base URL will be returned from web server 732. At a step 830, mobile device 714 places a request for a specific component resource. This could be any resource found on conventional web pages, e.g. similar to those shown in FIG. 1. As a further example, the URL for the user's electronic mailbox illustrates a specific component resource that may be requested. This request to the link for the user's mailbox will cause an optimized URL to be generated at a step 840, wherein the requested link will make up the newly created file for an optimized URL. This optimized URL, similar in form to file 200 in FIG. 2, will be stored at a step 850 in one embodiment.

A step 860, as depicted, encompasses the performance of a number of subsequent actions. As mobile device 714 places subsequent requests, a device on the network tracks the number of requests for the primary file at the base URL that are followed by a request for the link to the user's mailbox. This could accomplished at gateway 722 for example. Once a predetermined number of subsequent requests are made, a redirection threshold is met. This predetermined number of subsequent requests can be configured. By way of an illustrative example, one might assume that a requester places five subsequent requests for the user's mailbox when accessing a general portal web site. Once these requests have been received at a step 860, the system automatically redirects any future requests for the general portal web site to the optimized URL stored at step 850. Thus, rather than receive all of the content contained at the base URL, the user is only shown the component resource that he or she repeatedly requests—here the mailbox hypertext link.

It would be necessary to prevent a user from being "locked out" of a base URL, that is preventing any request to the URL to be redirected to the component resource. If redirection were blindly applied after the threshold had been met, any request placed to the base URL from the mobile device would continuously redirect. The enhanced URL could include a link to present the entire base web page. In this manner, requests placed from the enhanced URL to the base URL would not result in a redirection to the component resource, opening the potentially closed infinite loop of requests and redirections.

Figure 9:
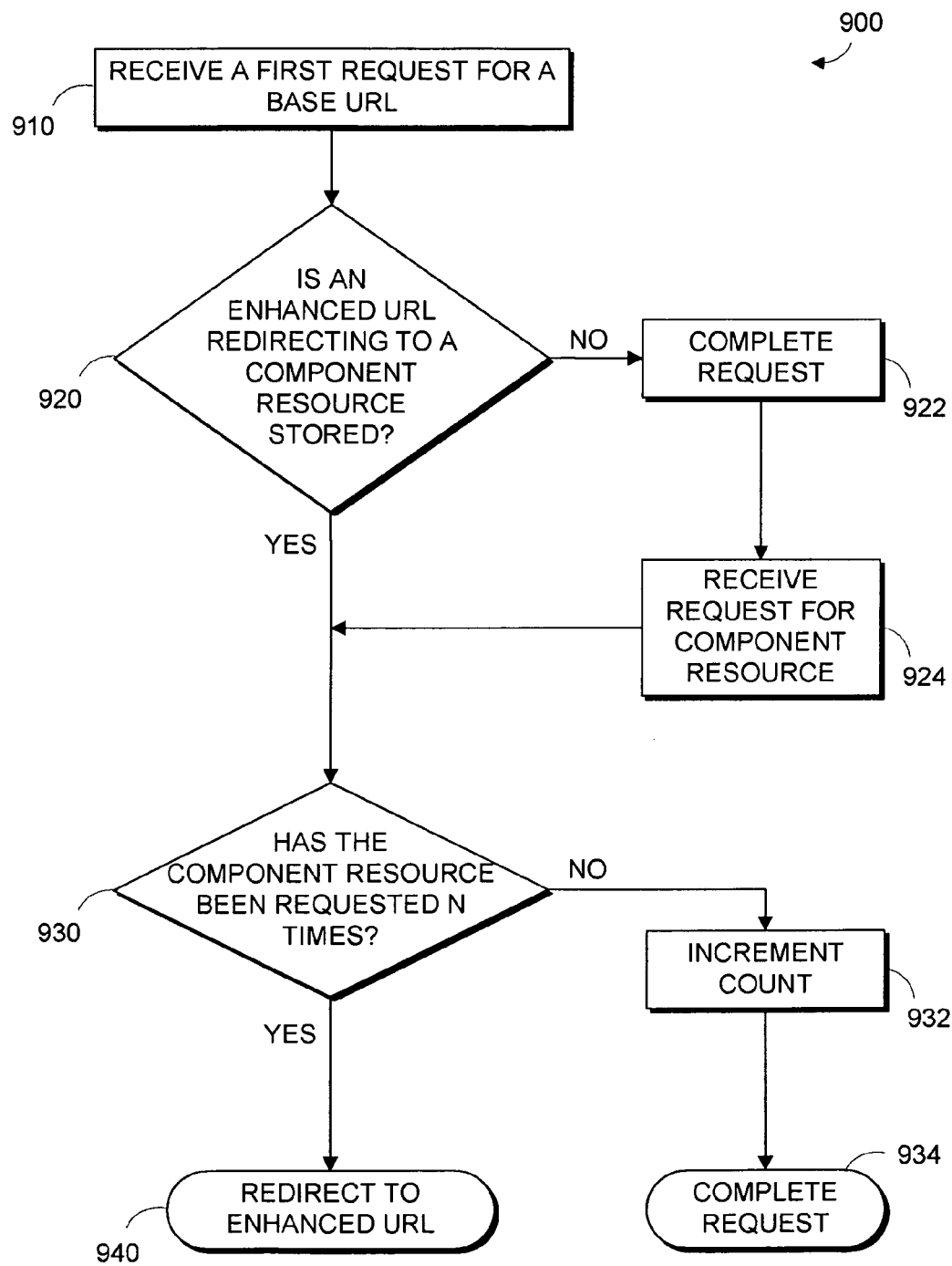
FIGS. 9-10 are flow diagrams of methods for redirecting requests for base URLs to frequently requested resources accessible from the base URL.
Figure 10:
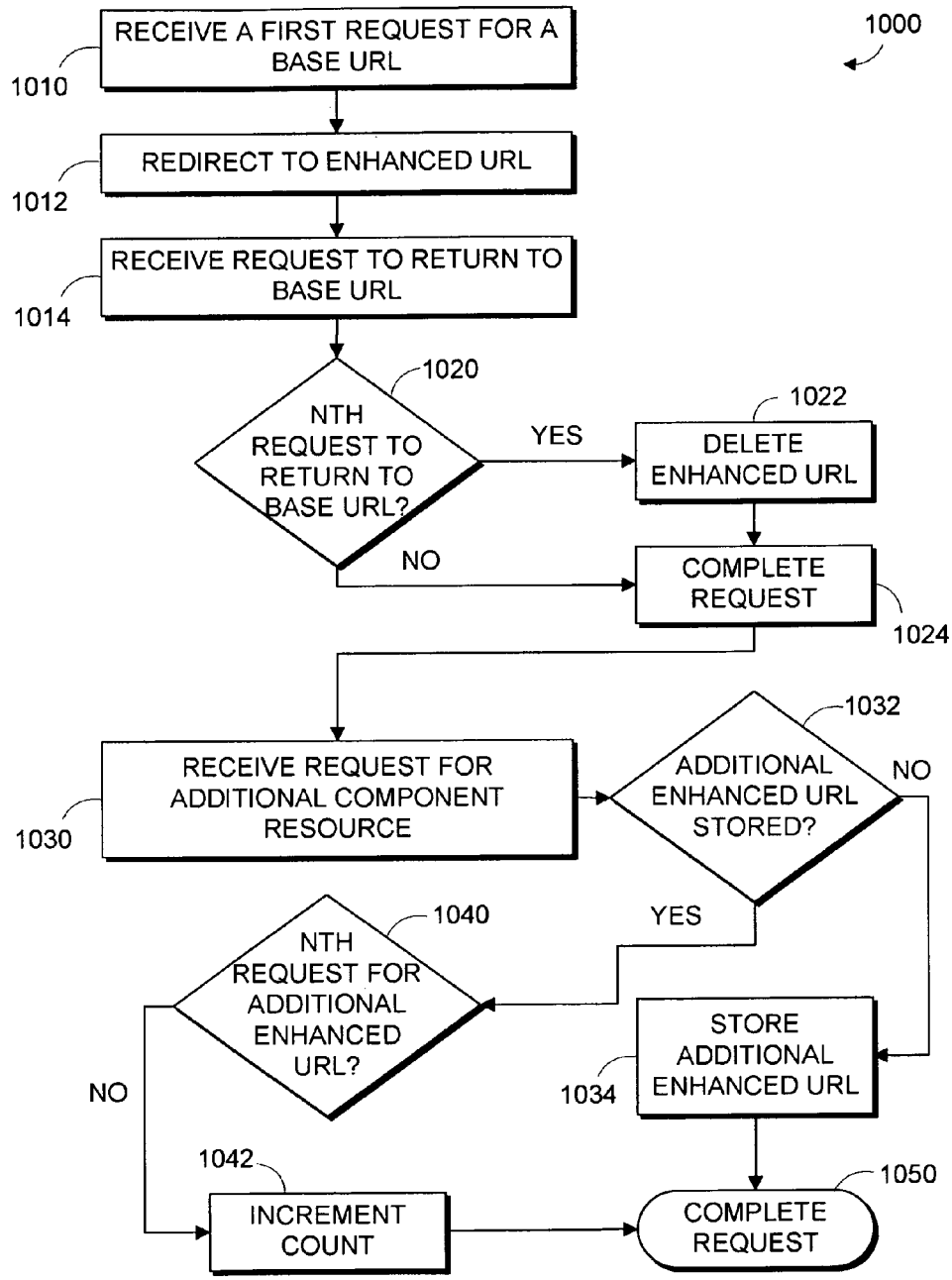

With reference now to FIGS. 9 and 10, flow diagrams depict methods that, when performed, redirect requests for base URLs to frequently requested resources accessible from the base URL. A method 900 is shown that begins at a step 910, wherein a first request for a base URL is received. This can be the request for a general portal web site as discussed above. At a step 920, a determination is made as to whether an enhanced URL is stored that would redirect the request to a component resource. This determination could be made through a search of data store 726 by gateway 722. As described previously, an enhanced URL could illustratively be the link to a user's electronic mailbox. If there is no enhanced URL stored in data store 726, then the request for the base URL is completed at a step 922. At a step 924, a request for a component resource directs the method to the same point of performance as if there had been a stored enhanced URL at step 920. At a determinative step 930, the number of times that the component resource has been requested is ascertained. As shown in FIG. 9, there is a threshold number of times, N, that must be met to trigger redirection. If at step 930 the component resource has not been requested N times, then the request count is incremented at a step 932 and the request is completed at a step 934. However, if the component resource has been requested N times, then the method redirects the request to the enhanced URL at a step 940. Thus, a request received at step 910 for a base URL with an enhanced URL stored that has been requested a sufficient number of times will lead to the presentation of the enhanced URL.

If the example given above is followed in this manner, then any request after the Nth request for the general portal web site will result in the presentation of the link for the user's electronic mailbox. This bypasses the need to display any other component resources accessed through the general portal web site, saving network resources that consume additional bandwidth, while at the same time improving the user's overall browsing experience. As previously mentioned, the additional request and data may be much smaller in terms of memory and bandwidth consumption than the full requested page.

Now looking at FIG. 10, a method 1000 is shown that continues principles used in method 900. At a step 1010, a first request to receive a base URL is redirected the an enhanced URL at a step 1012. This is completed by following the entirety of method 900. However, at a step 1014, mobile device 714 sends a request to return to the base URL. A link to return to the full web page can be included as part of the enhanced URL. At a step 1020, determination is made as to whether a predetermined number of requests have been sent to return to the base URL. If so, then the enhanced URL is deleted at a step 1022. This would be the case when the user frequently uses numerous component resources of the base URL. If the predetermined number of requests have not been sent to return to the base URL, or once the enhanced URL has been deleted, then the request is completed at a step 1024. This return-to-base rate could be higher than the N times needed for establishing redirection through an enhanced URL. As an example, returning to the general portal web site to use its search bar function intermittently would not immediately cease the redirection to the user's electronic mailbox. For instance, the user could return to the base URL up to 20 times so that additional resources can be added to the enhanced URL, or so that a different resource can be used as the enhanced URL altogether.

At this point, method 1000 is performed with similar operation as method 900. At a step 1030, a request to access an additional component resource is received. If the additional component resource is not found to be stored as an enhanced URL at a step 1032, then it is stored at a step 1034. If the additional component resource is found as an enhanced URL at step 1032, then the determination of the number of request instances occurs at a step 1040. If the second component is found to have been requested the requisite number of times, then the request is completed at a step 1050 and the method proceeds as above. In this respect, N requests could result in a new enhanced URL combining both the first and second resources that are frequently accessed. This could still be much less consumptive than presentation of the entire base URL. However, if the second resource has not been requested N times, then the count for requests is incremented at a step 1042 and then the request is completed at step 1050. Afterwards, the method begins anew with the same communication and examination processes shown.

Figure 11:
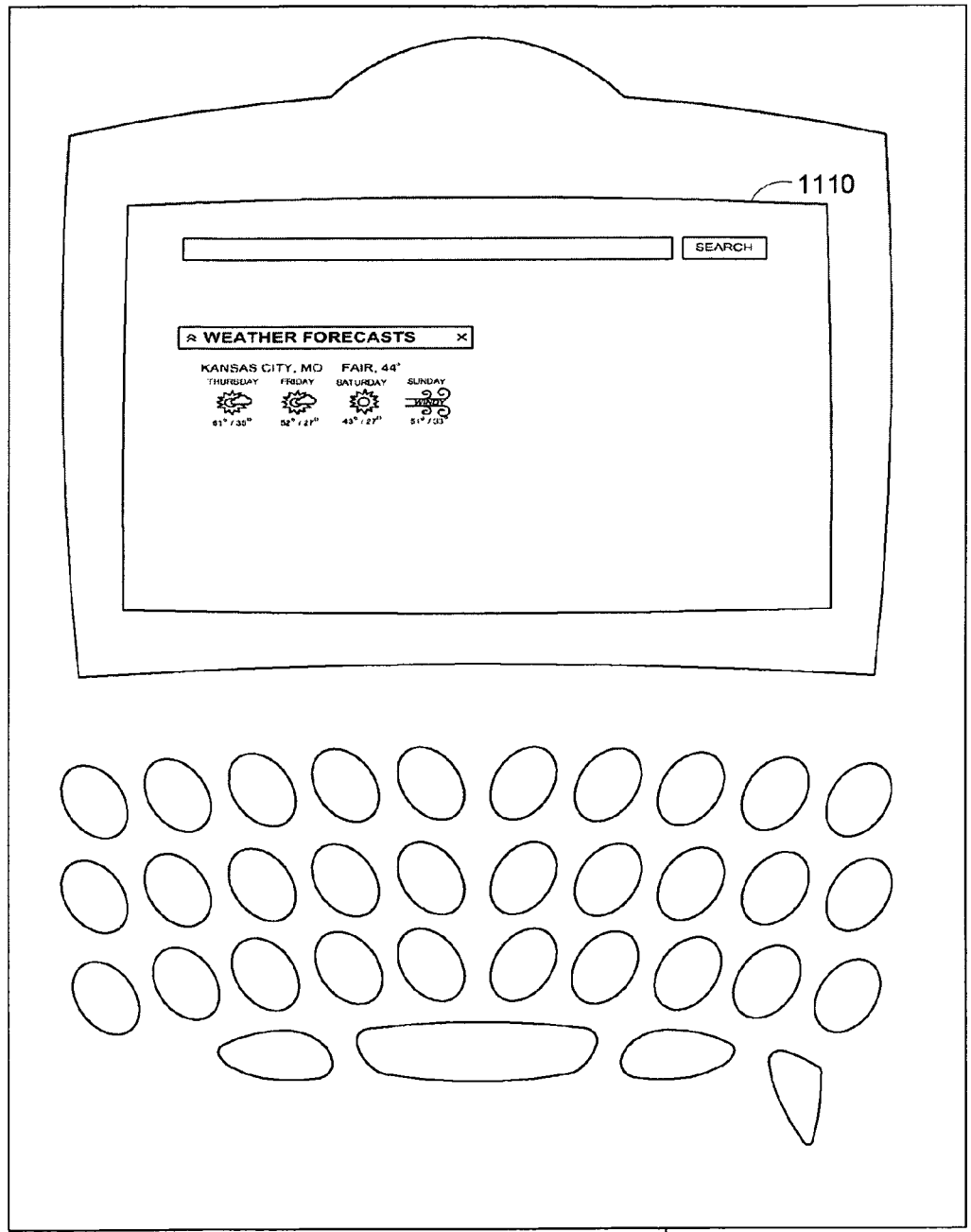
FIG. 11 is an exemplary simulated browser presentation on a web-enabled mobile device.

Turning to FIG. 11, a mobile device 1100 includes a fourth screen presentation 1110 showing a local weather forecast and a search bar. This implementation of the methods outlined above would be capable of presenting the most used features in tandem, so that frequent access of both resource components seen in FIGS. 4 and 5 would result in a combined presentation of the two component resources any time the base URL was requested. Of course, the replacement could be for any number of component resources at the base file. However, as a practical matter, increasing the number of component resources reduces the savings in terms of bandwidth consumption.

Another example following these methods could lead to the optimized URL of FIG. 4 being replaced with the optimized URL of FIG. 5 through method 1000. In the event that mobile device 714 was frequently requesting the full file 100 of the base URL, only to subsequently request the component resource shown in screen presentation 510, the originally optimized file 200 could be replaced altogether with a different optimized file. The threshold to add a component resource to an already-created file 200 could be lower than the number of requests needed to replace or remove a component resource from an enhanced URL. Again, these thresholds are not necessary to practice the invention, and N requests could remove or replace originally optimized file 200. The particular algorithm used for thresholding and replacement is unimportant. The count and comparison functions could be implemented at gateway 722 or as a portion of the information store at data store 726.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media with computer-executable instructions embodied thereon for performing a method of limiting bandwidth consumption in a network environment through customized presentation of browser-presentable resources, the method comprising:

receiving a first request from a user for resources associated with a base universal resource locator (URL);

receiving a second request from the user for a specific resource that is part of the resources associated with the base URL while the user is accessing the resources associated the base URL;

generating an optimized URL and associated optimized resources specifically for the user based on the second request for the specific resource, wherein the optimized resources associated with the optimized URL include a subset of the resources that are associated with base URL, the subset including the specific resource;

storing the optimized URL and the optimized resources;

redirecting a subsequent request from the user for the base URL to the optimized URL generated specifically for the user, when a predetermined number of additional requests for the specific resource are received from the user during the course of accessing the base URL, such that, the optimized resources are presented to the user while utilizing less bandwidth for delivery.

2. The media of claim 1, wherein each of the first request and the second request are received at a network gateway.

3. The media of claim 2, wherein the optimized URL is stored at the network gateway.

4. The media of claim 3, wherein the optimized URL is associated with a user profile at the network gateway.

5. The media of claim 4, wherein the optimized URL directs a browser to the optimized resources in a web page file in a markup programming language.

6. The media of claim 5, wherein the markup programming language is one of hypertext markup language (HTML), extensible markup language (XML), and extensible hypertext markup language (XHTML).

7. The media of claim 6, wherein the specific resource is at least one of a link to a different URL, a form, a flash object, a picture file, a movie file, an audio file, and a streaming media file.

8. The media of claim 2, wherein optimized URLs are stored on a central network device.

9. The media of claim 8, wherein the optimized URL and associated optimized resources generated specifically for the user are associated with a user profile at the central network device.

10. A system comprising one or more computer hardware components for presentation of web pages that enhances network bandwidth usage through recognition of repetitive user requests, the system comprising:

one or more network components configured to monitor user requests for universal resource locators (URLs); and a data structure storing one or more optimized URLs associated with optimized resources and a user profile of a user for whom the one or more optimized URLs was specifically generated for, wherein incident to the user requesting selected specific resources accessible via a base URL, the data structure associates an optimized URL generated for the user with the selected specific resources at the base URL, and redirects subsequent additional requests for the base URL to the optimized URL such that, the optimized resources are presented exclusively to the user while utilizing less bandwidth for delivery, wherein the optimized resources include the selected specific resources, the selected specific resources including a subset of one or more specific resources accessible via the base URL.

11. The system of claim 10, wherein the one or more network components are one or more network gateways.

12. The system of claim 11, wherein the store of optimized URLs is located at the one or more gateways.

13. The system of claim 11, wherein the store of optimized URLs is located on a core network device separate from the one or more gateways.

14. The system of claim 13, wherein the store further includes the user profile with which the optimized URL is associated.

15. One or more non-transitory computer-storage media having computer-executable instructions embodied thereon for performing a method of optimizing bandwidth usage through the delivery of customized presentation of frequently accessed universal resource locator (URL) resources, the method comprising:

receiving a first request from a user for resources associated with a base URL;

receiving a second request from the user for a first resource of a the resources that can be accessed from a file associated with the base URL;

storing a first optimized URL in association with a first optimized file that provides access to at least the first resource, wherein the first optimized URL is further stored specifically in association with the user;

after storing the first optimized URL and the first optimized file, receiving a predetermined number of additional requests from the user for the first resource by way of the base URL;

without user intervention, redirecting subsequent requests from the user for resources associated with the base URL to the first optimized URL based on:

(1) the first optimized URL being stored specifically in association with the user; and (2) the user sending the predetermined number of additional requests for the first resource via the base URL; and wherein the first optimized URL is a substitute for the base URL, such that, the first optimized file is accessible to the user while utilizing less bandwidth for delivery, wherein the first optimized file provides access to a subset of the resources that can be accessed from the file associated with the base URL;

presenting a link to the base URL as part of the accessing the first optimized file through the first optimized URL; and deleting the first optimized URL when a predetermined number of requests from the user to return from the optimized URL to the base URL are received.

16. The media of claim 15, wherein the file associated with the base URL and the first optimized file are web pages coded in a markup programming language.

17. The media of claim 16, wherein the markup programming language is one of hypertext markup language (HTML), extensible markup language (XML), and extensible hypertext markup language (XHTML).

18. The media of claim 15, wherein the first component resource is at least one of a link to a different URL, a form, a flash object, a picture file, a movie file, an audio file, and a streaming media file.

19. The media of claim 15 further comprising:

receiving a third request from the user to return to the resources associated with the base URL from the at least the first resource associated with optimized URL;

receiving a fourth request from the user for a second resource that can be accessed from the file associated with the base URL;

storing a second optimized URL in association with a second optimized file that provides access to at least the second resource;

after storing the second optimized URL and the second optimized file, when a predetermined number of additional requests for the second component resource are received, then replacing the first optimized URL with the second optimized URL; and without user intervention, redirecting subsequent requests for the base URL to the second optimized URL.

* * * * *